(12) United States Patent
Hayashi et al.

(10) Patent No.: US 11,691,276 B2
(45) Date of Patent: Jul. 4, 2023

(54) LINK ACTUATION APPARATUS

(71) Applicants: KYUSHU INSTITUTE OF TECHNOLOGY, Fukuoka (JP); NTN CORPORATION, Osaka (JP)

(72) Inventors: Akihiro Hayashi, Iizuka (JP); Hirofumi Fukumaru, Iizuka (JP); Toshiki Takagi, Iizuka (JP); Kenzou Nose, Iwata (JP); Hideki Matsuzawa, Iwata (JP)

(73) Assignees: KYUSHU INSTITUTE OF TECHNOLOGY, Fukuoka (JP); NTN CORPORATION, Osaka (JP)

( * ) Notice: Subject to any disclaimer, the term of this patent is extended or adjusted under 35 U.S.C. 154(b) by 16 days.

(21) Appl. No.: 17/616,607

(22) PCT Filed: May 29, 2020

(86) PCT No.: PCT/JP2020/021339
§ 371 (c)(1),
(2) Date: Dec. 3, 2021

(87) PCT Pub. No.: WO2020/246384
PCT Pub. Date: Dec. 10, 2020

(65) Prior Publication Data
US 2022/0234199 A1    Jul. 28, 2022

(30) Foreign Application Priority Data
Jun. 5, 2019   (JP) .............................. JP2019-105693

(51) Int. Cl.
*B25J 9/16*   (2006.01)
*B25J 9/00*   (2006.01)
(Continued)

(52) U.S. Cl.
CPC ........... *B25J 9/1623* (2013.01); *B25J 9/0048* (2013.01); *B25J 9/106* (2013.01); *F16H 21/46* (2013.01)

(58) Field of Classification Search
CPC ...... B25J 9/0048; B25J 9/106; B25J 9/19623; G16H 21/46
See application file for complete search history.

(56) References Cited

U.S. PATENT DOCUMENTS

2016/0008977 A1*  1/2016  Nishio ....................... B25J 9/06
                                                          700/262
2016/0195141 A1*  7/2016  Sone ................... F16C 33/6674
                                                          464/111
2016/0361816 A1*  12/2016 Sakata .................... F16H 21/46

FOREIGN PATENT DOCUMENTS

JP          61-65790 A    4/1986
JP        2005-098497 A   4/2005
(Continued)

OTHER PUBLICATIONS

International Search Report issued in corresponding international Patent Application No. PCT/JP2020/021339, dated Aug. 4, 2020, with English translation.

*Primary Examiner* — Dale Moyer
(74) *Attorney, Agent, or Firm* — McDermott Will & Emery LLP

(57) ABSTRACT

A link actuation apparatus that actuates a parallel link mechanism where a spherical drive mechanism is constructed includes a controller configured to calculate, based on spherical trigonometry, an attitude of a second link hub from angles $\beta_{A1}$ and $\beta_{A2}$ that represent the attitude of a first end link member with respect to a first link hub in two of at least three link mechanisms. The link actuation apparatus capable of performing forward transformation in real time is thus provided.

4 Claims, 10 Drawing Sheets

(51) Int. Cl.
*B25J 9/10* (2006.01)
*F16H 21/46* (2006.01)

(56) References Cited

FOREIGN PATENT DOCUMENTS

| | | |
|---|---|---|
| JP | 2015-155124 A | 8/2015 |
| JP | 2016-147351 A | 8/2016 |
| JP | 6133162 B2 | 5/2017 |
| JP | 61-65790 B2 | 7/2017 |

* cited by examiner

LINK ACTUATION APPARATUS

CROSS-REFERENCE OF RELATED APPLICATIONS

This application is the U.S. National Phase under 35 U.S.C. § 371 of International Patent Application No. PCT/JP2020/021339, filed on May 29, 2020, which in turn claims the benefit of Japanese Application No. 2019-105693, filed on Jun. 5, 2019, the entire disclosures of which Applications are incorporated by reference herein.

TECHNICAL FIELD

This invention relates to a link actuation apparatus.

BACKGROUND ART

A link actuation apparatus is used in industrial equipment that requires a precise and wide range of actuation. The link actuation apparatus is constituted of a drive source and a link mechanism. A parallel link mechanism has been known as one type of the link mechanism.

For example, a link actuation apparatus as shown in Japanese Patent No. 6133162 (PTL 1) has been proposed as a link actuation apparatus capable of operating in a precise and wide range of actuation with a compact construction.

CITATION LIST

Patent Literature

PTL 1: Japanese Patent No. 6133162
PTL 2: Japanese Patent Laying-Open No. 2005-098497

SUMMARY OF INVENTION

Technical Problem

In the link actuation apparatus as shown in Japanese Patent No. 6133162 (PTL 1), in a relational expression between a tip end and a base end, an angle of rotation of a drive source for attitude control at a certain tip end coordinate is found by inverse transformation. Similarly, for forward transformation, a method of calculating a tip end position from angles of rotation of two axes of two drive sources for attitude control is shown, however, calculation errors are accumulated because a large number of sums of product of a trigonometric function and an inverse trigonometric function appear in a theoretical equation.

In PTL 2, forward transformation gives an approximate solution by convolution operations and requires repetitive operations. Therefore, it takes time to calculate a tip end position. Therefore, disadvantageously, real-time processing is difficult, and direct teaching or an operation to move over a long distance from a state that the current position is unknown, such as a state after recovery from abnormality, has been impossible.

The present invention was made to solve such problems, and an object thereof is to provide a link actuation apparatus capable of achieving improvement in accuracy in positioning with less accumulation of calculation errors and performing forward transformation in real time.

Solution to Problem

The present disclosure relates to a link actuation apparatus. The link actuation apparatus includes a first link hub on a base end side, a second link hub on a tip end side, and at least three link mechanisms that couple the first link hub and the second link hub to each other. Each of the at least three link mechanisms includes a first end link member rotatably coupled to the first link hub, a second end link member rotatably coupled to the second link hub, and a central link member rotatably coupled to each of the first end link member and the second end link member. In the at least three link mechanisms, at least three central axes of revolute pair portions of the first link hub and the first end link members and a central axis of a revolute pair portion of one end of the central link member intersect at a first link hub center point, and at least three central axes of revolute pair portions of the second link hub and the second end link members and a central axis of a revolute pair portion of the other end of the central link member intersect at a second link hub center point. The link actuation apparatus further includes a controller configured to calculate based on spherical trigonometry, a position and an attitude of the second link hub from angles of the first end link members with respect to the first link hub in two of the at least three link mechanisms.

Preferably, the controller is configured to calculate based on spherical trigonometry, an angle representing the attitude of the first end link member from the position of the second link hub center point.

Advantageous Effects of Invention

According to the present invention, a link actuation apparatus including a spherical drive mechanism can perform forward transformation in real time.

DESCRIPTION OF EMBODIMENTS

Figure 1:
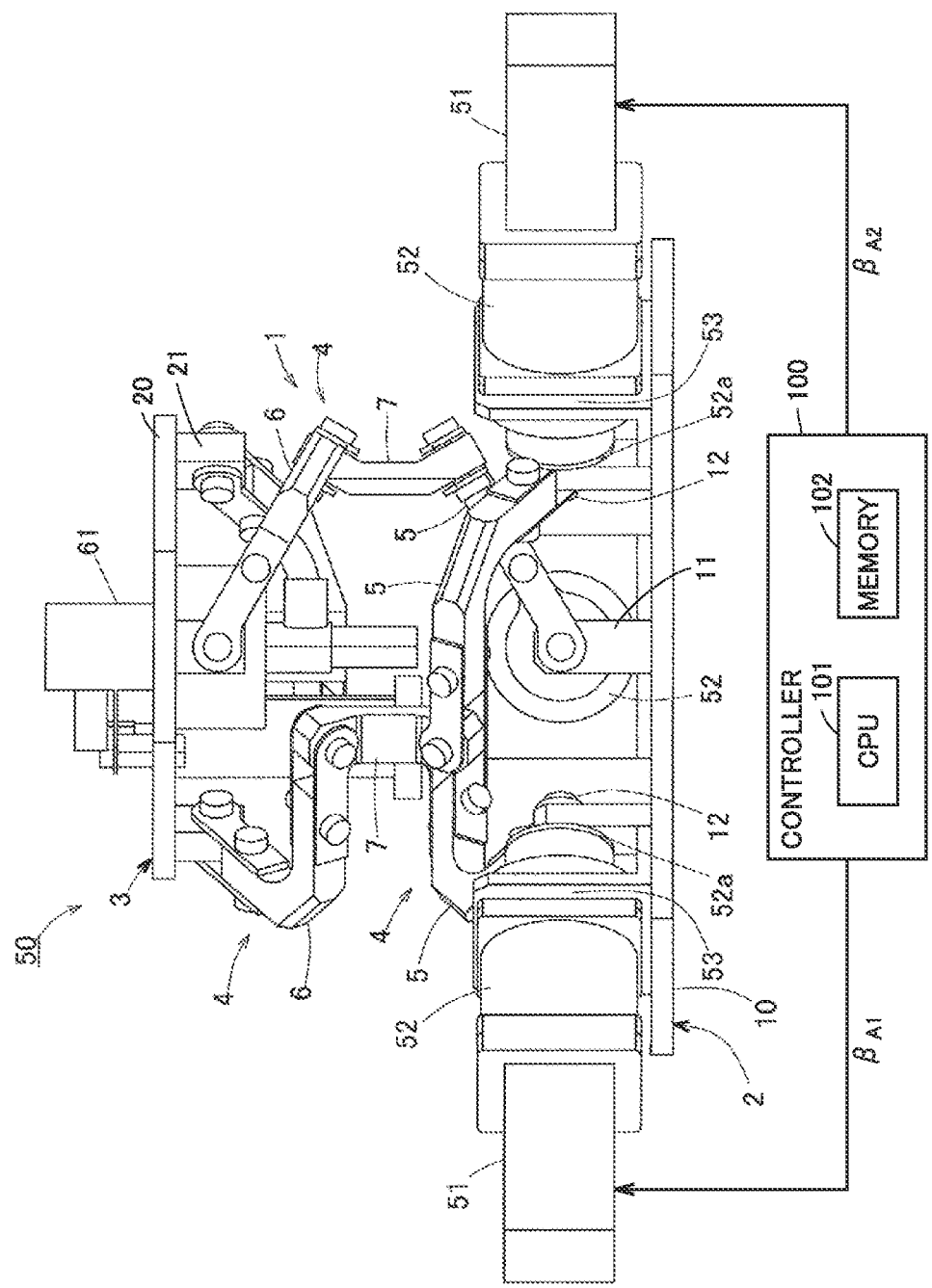
FIG. 1 is a front view of a link actuation apparatus in a certain attitude.

An embodiment of the present invention will be described below with reference to the drawings. The same or corresponding elements in the drawings below have the same reference characters allotted and description thereof will not be repeated.

<Construction of Link Actuation Apparatus>

A construction of a link actuation apparatus including a parallel link mechanism according to one embodiment of this invention will be described with reference to FIGS. 1 to 3.

FIG. 1 is a front view of a link actuation apparatus in a certain attitude. Referring to FIG. 1, a link actuation apparatus 50 includes a parallel link mechanism 1, an actuator 51 for changing an attitude of parallel link mechanism 1, a reducer mechanism 52 that reduces drive force of the actuator and transmits reduced drive force to the parallel link mechanism, and a controller 100 that controls actuator 51.

Parallel link mechanism 1 is such a mechanism that a link hub 3 on a tip end side is coupled to a link hub 2 on a base end side with three link mechanisms 4 being interposed so as to be able to change the attitude. Four or more link mechanisms 4 may be provided. An end effector 61 is provided in link hub 3 on the tip end side.

Figure 2:
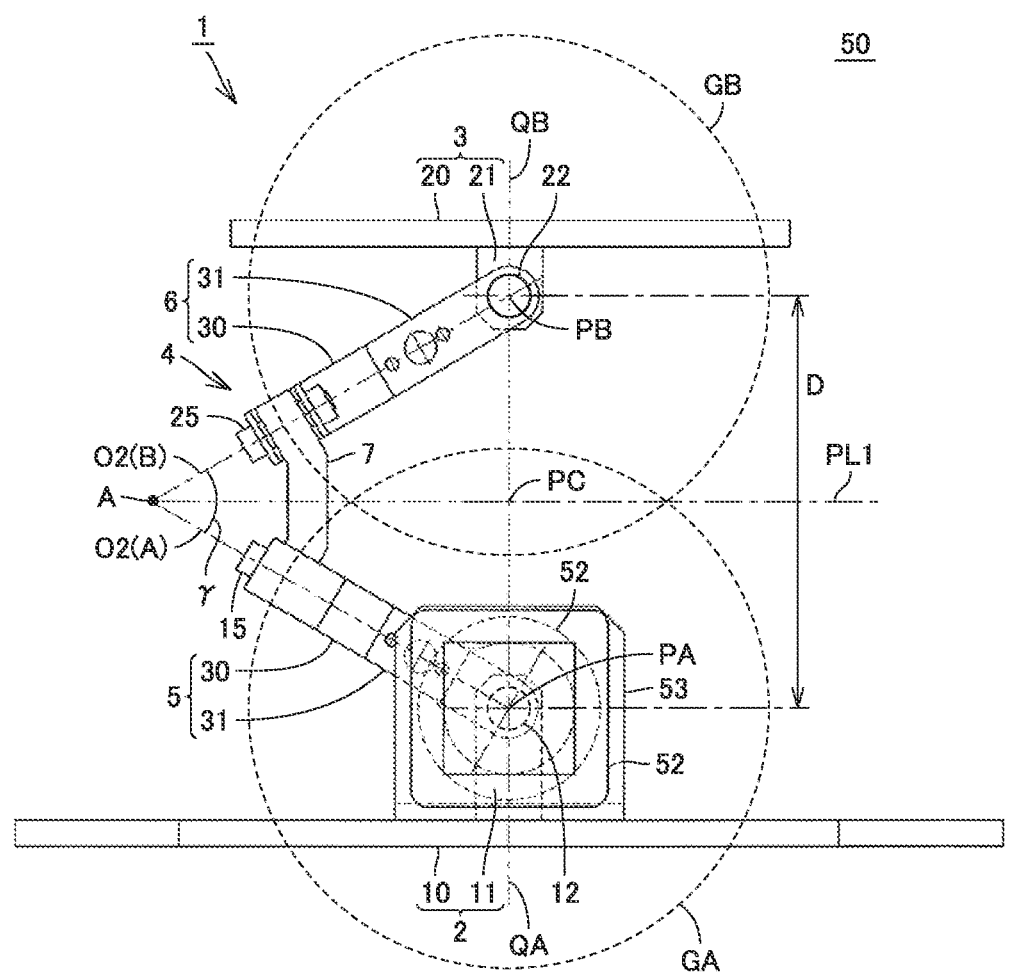
FIG. 2 is a diagram representatively showing a construction corresponding to one link mechanism 4 in a construction of a link actuation apparatus 50.

FIG. 2 is a diagram representatively showing a construction corresponding to one link mechanism 4 in the construction of link actuation apparatus 50. Referring to FIG. 2, each link mechanism 4 includes an end link member 5 on the base end side, an end link member 6 on the tip end side, and a central link member 7, and the link mechanisms form a four-bar link mechanism including four revolute pairs. End link member 5 on the base end side has one end rotatably coupled to link hub 2 on the base end side. Similarly, end link member 6 on the tip end side has one end rotatably coupled to link hub 3 on the tip end side. End link member 5 on the base end side has the other end rotatably coupled to one end of central link member 7. End link member 6 on the tip end side has the other end rotatably coupled to the other end of central link member 7.

As shown in FIGS. 1 and 2, link hub 2 on the base end side is constituted of a base 10 in a shape of a flat plate and three rotation shaft coupling members 11 arranged on base 10 at regular intervals in a circumferential direction. A rotation shaft body 12 having a shaft center intersecting with a link hub central axis QA is rotatably coupled to each rotation shaft coupling member 11. One end of end link member 5 on the base end side is coupled to rotation shaft body 12. A rotation shaft body 15 rotatably coupled to one end of central link member 7 is coupled to the other end of end link member 5 on the base end side. Though rotation shaft coupling members 11 are arranged on base 10 at regular intervals in the circumferential direction in the present embodiment, it is not necessarily the case.

A rotation shaft body 22 of link hub 3 and a rotation shaft body 25 of central link member 7 are also identical in shape to rotation shaft bodies 12 and 15, respectively.

As shown in FIGS. 1 and 2, link hub 3 on the tip end side is constituted of a tip end member 20 in a shape of a flat plate and three rotation shaft coupling members 21 arranged on tip end member 20 at regular intervals in the circumferential direction. Rotation shaft body 22 having a shaft center intersecting with a link hub central axis QB is rotatably coupled to each rotation shaft coupling member 21. One end of end link member 6 on the tip end side is coupled to rotation shaft body 22 of link hub 3. Rotation shaft body 25 rotatably coupled to the other end of central link member 7 is coupled to the other end of end link member 6 on the tip end side.

A central axis O2(A) of a revolute pair of end link member 5 and central link member 7 intersects with a central axis O2(B) of a revolute pair of end link member 6 and central link member 7 at an angle of intersection γ at a point A.

Figure 3:
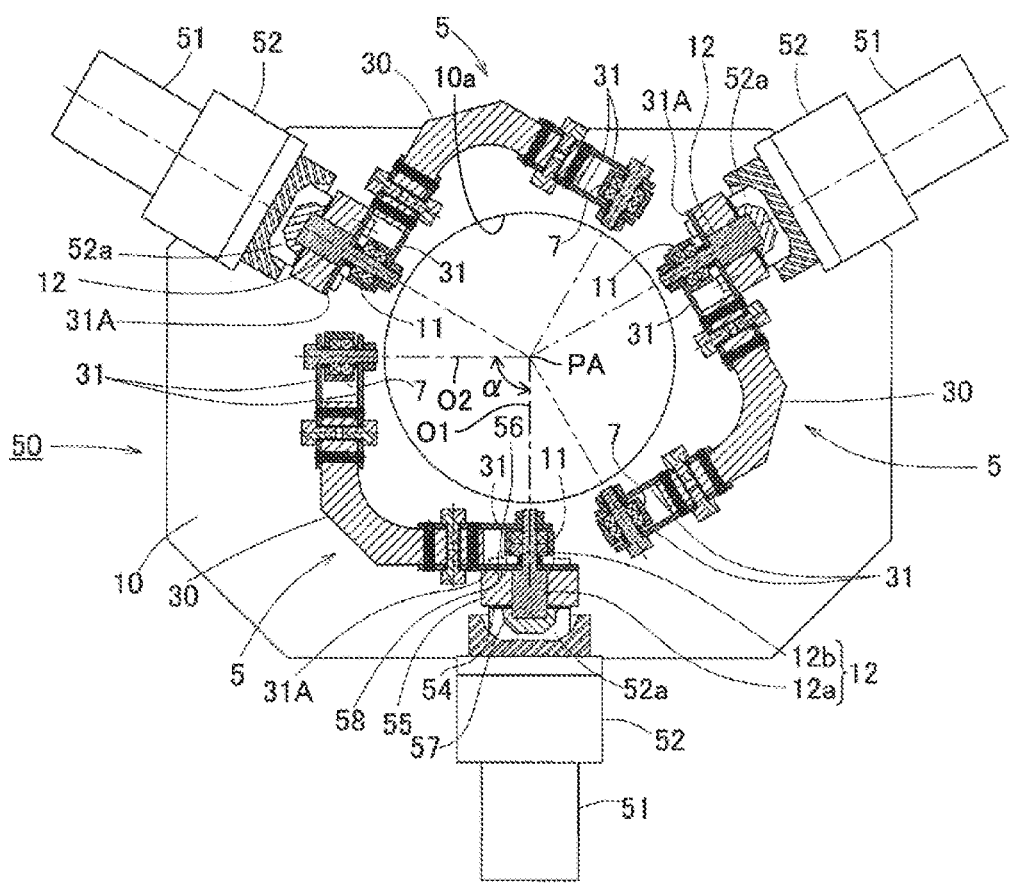
FIG. 3 is a cross-sectional view showing a link hub 2 on a base end side of a parallel link mechanism and an end link member 5 on the base end side as being extracted.

FIG. 3 is a cross-sectional view showing link hub 2 on the base end side of the parallel link mechanism and end link member 5 on the base end side as being extracted. FIG. 3 shows a state that link hub 3 on the tip end side, end link member 6 on the tip end side, and central link member 7 have been removed from the parallel link mechanism in the attitude in FIG. 1. For each of three end link members 5, a cross-section along a plane including rotation axes O1 and O2 of revolute pair portions at opposing ends is shown.

Referring to FIGS. 1 and 3, actuator 51 for changing the attitude that arbitrarily changes the attitude of link hub 3 on the tip end side with respect to link hub 2 on the base end side is provided in each of three link mechanisms 4. Reducer mechanism 52 is provided in each actuator 51. Each actuator 51 is a rotary actuator, and provided coaxially with rotation shaft body 12 on an upper surface of base 10 of link hub 2 on the base end side. Actuator 51 and reducer mechanism 52 are integrally provided, and reducer mechanism 52 is fixed to base 10 by a motor fixing member 53. By providing actuator 51 in at least two of three link mechanisms 4, the attitude of link hub 3 on the tip end side with respect to link hub 2 on the base end side can be fixed.

In FIG. 3, reducer mechanism 52 includes a large-diameter output shaft body 52a that forms a flange joint. A tip end surface of output shaft body 52a is a planar flange surface 54 orthogonal to a centerline of output shaft body 52a. Output shaft body 52a is connected by a bolt 56 to a rotation shaft support member 31 on an outer side of end link member 5 on the base end side with a spacer 55 being interposed. Rotation shaft body 12 in the revolute pair portion of link hub 2 and end link member 5 is constituted of a large-diameter portion 12a and a small-diameter portion 12b. Small-diameter portion 12b is inserted into an inner ring of a bearing and large-diameter portion 12a is fitted to an inner groove 57 provided in output shaft body 52a of reducer mechanism 52.

End link member 5 is in an L shape. End link member 5 is constituted of one curved member 30 and four rotation shaft support members 31 in total fixed to side surfaces on an outer side and side surfaces on an inner side of opposing ends of curved member 30. Four rotation shaft support members 31 are not identical in shape, and a rotation shaft support member 31A on the outer side provided in the revolute pair portion of link hub 2 on the base end side includes a flange attachment surface 58 coupled to flange surface 54 of reducer mechanism 52 with spacer 55 being interposed. Though end link member 5 is in the L shape in the present embodiment, it does not necessarily have to be in the L shape.

In link actuation apparatus 50, end effector 61 is provided in link hub 3 on the tip end side as shown, for example, in FIG. 1. As actuator 51 changes the attitude of link hub 3 on the tip end side with respect to link hub 2 on the base end side, an angle of end effector 61 can be controlled through two degrees of freedom.

FIG. 3 shows relation, in connection with three link mechanisms 3, among a central axis O1 of the revolute pair of link hub 2 on the base end side and end link member 5 on the base end side, a central axis O2 of the revolute pair of end link member 5 and central link member 7, and a spherical link center PA. Shapes of link hub 3 on the tip end side and end link member 6 on the tip end side and positional relation therebetween (not shown) are also similar to those in FIG. 3. Though an angle α(an arm angle) formed between central axis O1 and central axis O2 is set to 90° in the example in FIG. 3, angle α may be set to an angle other than 90°.

Parallel link mechanism 1 has a structure of two spherical link mechanisms as being combined.

Central axis O1 of the revolute pair of link hub 2 and end link member 5 intersects with central axis O2 of the revolute pair of end link member 5 and central link member 7 at spherical link center PA (FIGS. 2 and 3) on the base end side. On the base end side, a distance along axis O1 between the revolute pair of link hub 2 and end link member 5 and spherical link center PA is equal to a distance along axis O2 between the revolute pair of end link member 5 and central link member 7 and spherical link center PA.

Though not shown, similarly, the central axis of a revolute pair of link hub 3 and end link member 6 intersects with the central axis of a revolute pair of end link member 6 and central link member 7 at a spherical link center PB (FIG. 2) on the tip end side. On the tip end side, a distance between each revolute pair of link hub 3 and end link member 6 and spherical link center PB is equal to a distance between the revolute pair of end link member 6 and central link member 7 and spherical link center PB.

Figure 4:
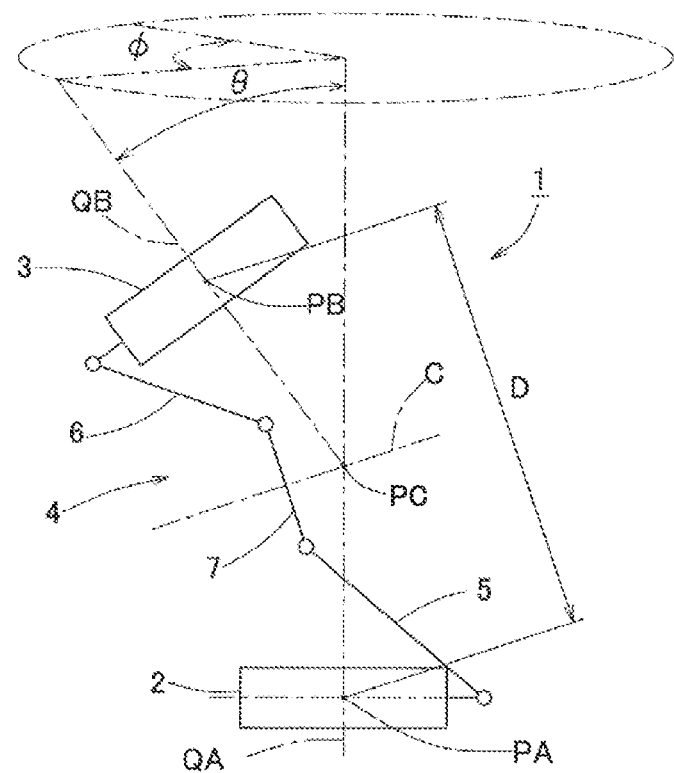
FIG. 4 is a schematic diagram that expresses with a straight line, one of three link mechanisms 4 of a parallel link mechanism 1 as being extracted.

FIG. 4 is a schematic diagram that expresses with a straight line, one of three link mechanisms 4 of parallel link mechanism 1 as being extracted. Three link mechanisms 4 are in a geometrically identical symmetrical shape. The geometrically identical symmetrical shape refers to such a shape that a geometrical model expressing end link members 5 and 6 and central link member 7 with a straight line and showing the revolute pair with a circle has a base end side portion and a tip end side portion in a symmetrical shape with respect to a bisecting plane. Parallel link mechanism 1 in the present embodiment is of a rotation symmetry type, and positional relation between link hub 2 on the base end side and end link member 5 on the base end side and link hub 3 on the tip end side and end link member 6 on the tip end side is constructed to be in rotation symmetry with respect to a centerline C of central link member 7.

A two-degree-of-freedom mechanism in which link hub 3 on the tip end side is rotatable with respect to link hub 2 on the base end side around two orthogonal axes is constituted of link hub 2 on the base end side, link hub 3 on the tip end side, and three link mechanisms 4. In other words, the two-degree-of-freedom mechanism is such a mechanism that the attitude of link hub 3 on the tip end side can freely be varied through two degrees of freedom with respect to link hub 2 on the base end side. This two-degree-of-freedom mechanism can be wide in movable range of link hub 3 on the tip end side with respect to link hub 2 on the base end side while it is compact.

For example, a straight line that passes through spherical link center PA and intersects at a right angle with central axis O1 (FIG. 3) of the revolute pair of link hub 2 and end link member 5 is defined as link hub central axis QA which is the central axis of link hub 2. A straight line that passes through spherical link center PB and intersects at the right angle with the central axis (not shown) of the revolute pair of link hub 3 and end link member 6 is defined as central axis QB of link hub 3.

In this case, a maximum value of an angle of bending θ (FIG. 4) between central axis QA of link hub 2 on the base end side and central axis QB of link hub 3 on the tip end side can be set to approximately ±90°. An angle of revolution ϕ(FIG. 4) of link hub 3 on the tip end side with respect to link hub 2 on the base end side can be set within a range from 0° to 360°. Angle of bending θ refers to an angle of tilt of central axis QB with respect to central axis QA in a vertical plane including central axis QA and central axis QB, and angle of revolution ϕ refers to an angle formed with respect to a reference position by a straight line resulting from projection of central axis QB on a horizontal plane.

The attitude of link hub 3 on the tip end side with respect to link hub 2 on the base end side is varied around an intersection PC between link hub central axis QA on the base end side and link hub central axis QB on the tip end side. Even when the attitude is varied, a distance D (FIG. 4) between spherical link centers PA and PB on the base end side and the tip end side is not varied.

In parallel link mechanism 1, a condition below is satisfied. Specifically, link mechanisms 4 are equal to one another in angle formed between central axis O1 of the revolute pair of link hub 2 and end link member 5 and central axis O2 of the revolute pair of link hub 3 and end link member 6. Lengths from spherical link centers PA and PB to the revolute pair portion are equal to each other. A central axis O1(A) of the revolute pair of link hub 2 and end link member 5 of each link mechanism 4 intersects with spherical link center PA on the base end side. Central axis O2(A) of the revolute pair of end link member 5 and central link member 7 of each link mechanism 4 intersects with spherical link center PA on the base end side. A central axis O1(B) of the revolute pair of link hub 3 and end link member 6 of each link mechanism 4 intersects with spherical link center PB on the tip end side. Central axis O2(B) of the revolute pair of end link member 6 and central link member 7 of each link mechanism 4 intersects with spherical link center PB on the tip end side. End link member 5 on the base end side is identical in geometrical shape to end link member 6 on the tip end side, and central link member 7 is also identical in its shape between the base end side and the tip end side. When these conditions are satisfied, by setting angular positional relation between central link member 7 and end link members 5 and 6 with respect to a symmetry plane of central link member 7 to be identical between the base end side and the tip end side, link hub 2 on the base end side and end link member 5 on the base end side and link hub 3 on the tip end side and end link member 6 on the tip end side make identical motion symmetrical with respect to the bisecting plane, based on geometrical symmetry.

Forward kinematics and inverse kinematics in link actuation apparatus 50 constructed as described above will be described. Forward kinematics and inverse kinematics have been known as a method of controlling a joint of a robot or a manipulator. In the description of the present embodiment, forward kinematics refers to determination of a central position and a direction of the link hub on the tip end side based on an angle formed by end link member 5 with respect to link hub 2 on the base end side. Inverse kinematics refers to determination of an angle formed by end link member 5 with respect to link hub 2 on the base end side based on a central position and a direction of the link hub on the tip end side. Forward kinematics and inverse kinematics in the present embodiment both represent calculation of the central position on the tip end side. Though forward kinematics and inverse kinematics do not determine a direction, when a position of the tip end is determined, a direction can also be found with simplified calculation based on geometrical properties of a mechanism.

<Forward Kinematics>

Figure 5:
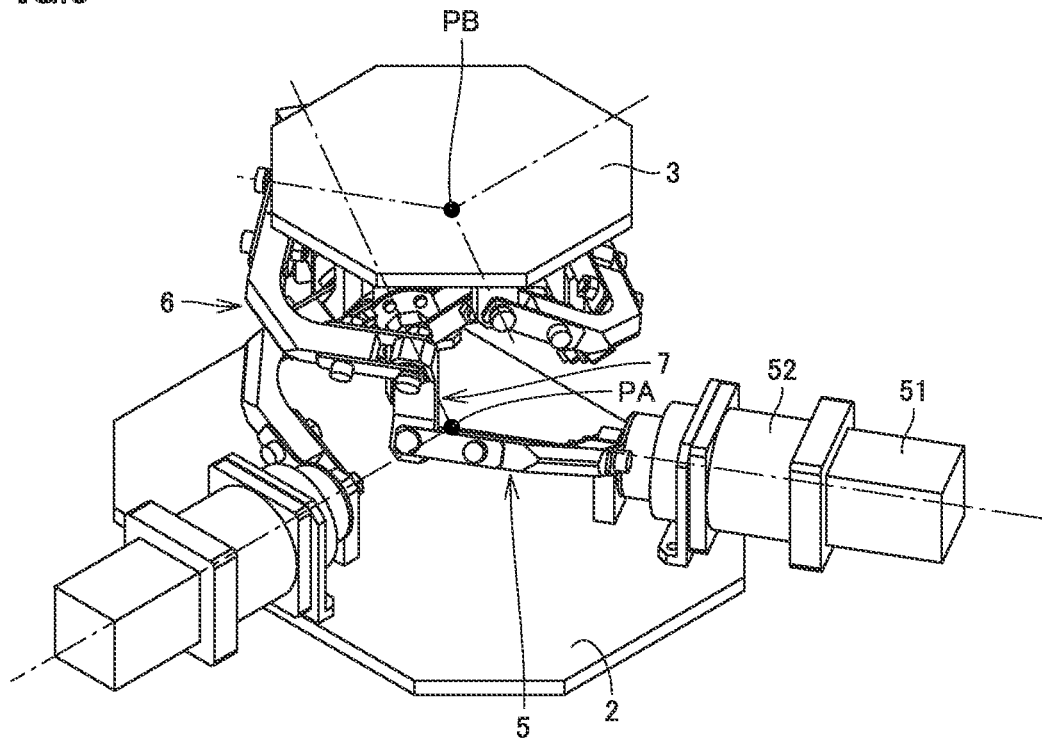
FIG. 5 is a perspective view of the link actuation apparatus while a link hub central axis QA on the base end side and a link hub central axis QB on a tip end side are collinearly located.
Figure 6:
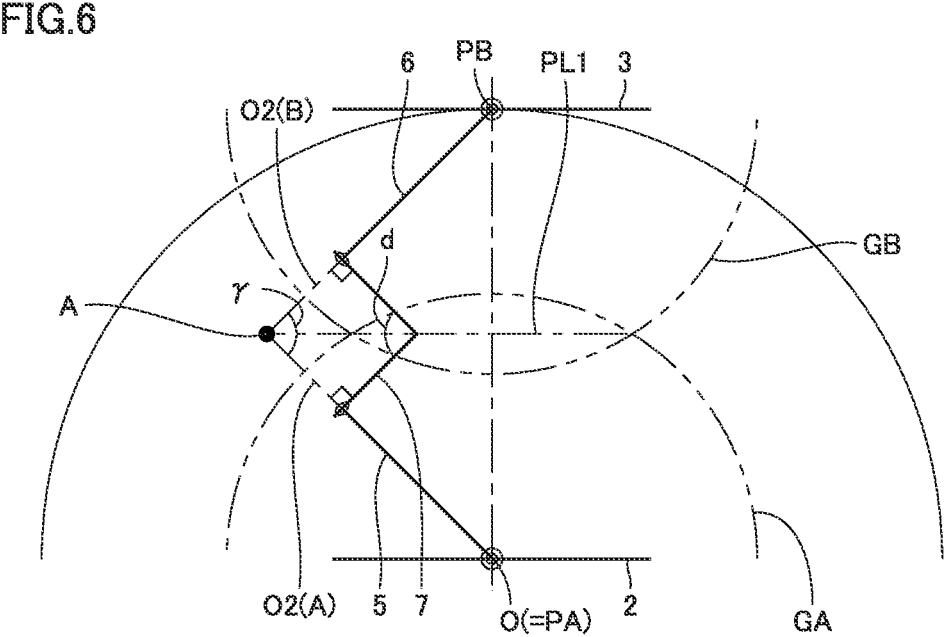
FIG. 6 is a schematic diagram of the link actuation apparatus while link hub central axis QA on the base end side and link hub central axis QB on the tip end side are collinearly located.

FIG. 5 is a perspective view of the link actuation apparatus while link hub central axis QA on the base end side and link hub central axis QB on the tip end side are collinearly located. FIG. 6 is a schematic diagram of the link actuation apparatus while link hub central axis QA on the base end side and link hub central axis QB on the tip end side are collinearly located.

FIG. 5 shows a zero position of link actuation apparatus 50. The zero position herein refers to an attitude in a state that central axis QA of link hub 2 on the base end side and central axis QB of link hub 3 on the tip end side coincide with each other. In other words, the zero position refers to such an attitude that angle of bending θ of link actuation apparatus 50 is at a zero degree.

FIG. 2 shows the front view of only one of three link mechanisms at the zero position in FIG. 1 and FIG. 6 shows a model diagram of the link actuation apparatus as being simplified. The link mechanisms can be expressed as being simplified as the link hubs on the base end side and the tip end side, the end link members on the base end side and the tip end side, and the central link members.

Parallel link mechanism 1 of link actuation apparatus 50 is constructed to be in mirror symmetry with respect to a bisecting plane PL1 which is a plane defined by intersections between a spherical link GA on the base end side around link hub center point PA on the base end side and a spherical link GB on the tip end side around link hub center point PB on the tip end side. Point A where central axis O2(A) of the revolute pair portion of end link member 5 on the base end side and central link member 7 intersects with central axis O2(B) of the revolute pair portion of end link member 6 on the tip end side and central link member 7 is located on bisecting plane PL1. An angle formed between central axis O2(A) of the revolute pair portion of end link member 5 on the base end side and central link member 7 and central axis O2(B) of the revolute pair portion of end link member 6 on the tip end side and central link member 7 is referred to as an axial angle γ. An angle formed by central link member 7 is referred to as a central angle d. To be exact, central angle d refers to an angle formed by intersection on the bisecting plane, between a straight line perpendicular to central axis O2(A) of the revolute pair portion of end link member 5 on the base end side and central link member 7 and a straight line perpendicular to central axis O2(B) of the revolute pair portion of end link member 6 on the tip end side and central link member 7. Axial angle γ and central angle d are constants determined at the time of design of parallel link mechanism 1. In FIG. 6, central angle d can be expressed as d=π−γ(rad) by using axial angle γ.

Figure 7:
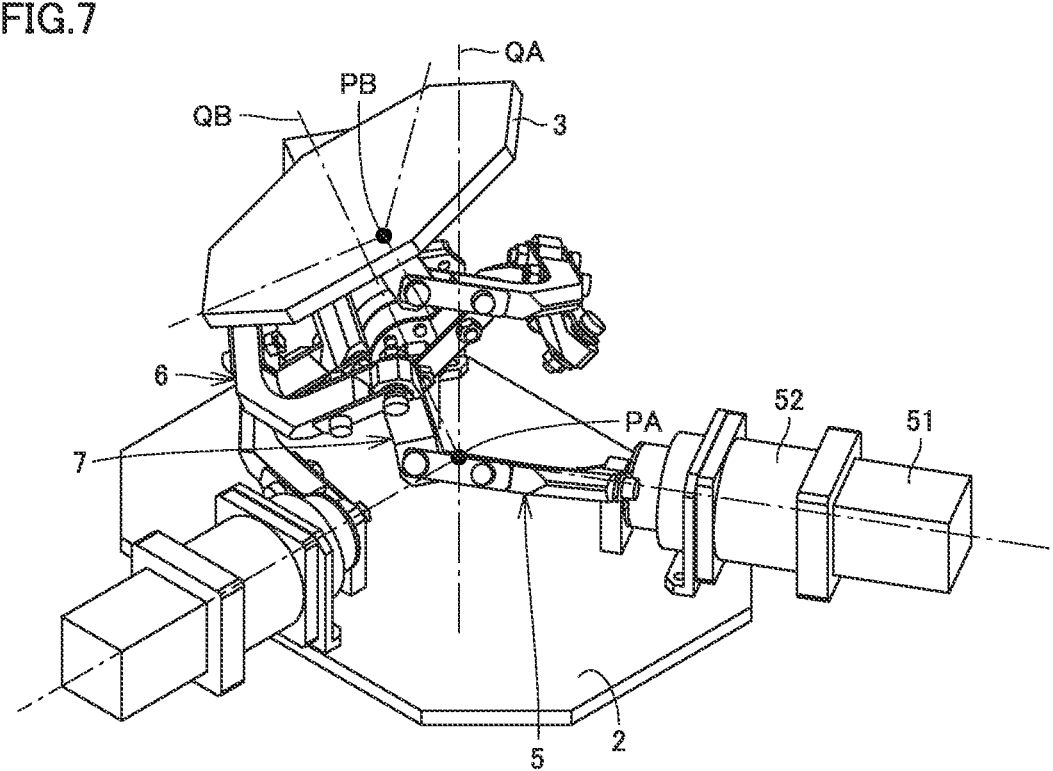
FIG. 7 is a perspective view of the link actuation apparatus while link hub central axis QB on the tip end side forms a certain angle with respect to link hub central axis QA on the base end side.
Figure 8:
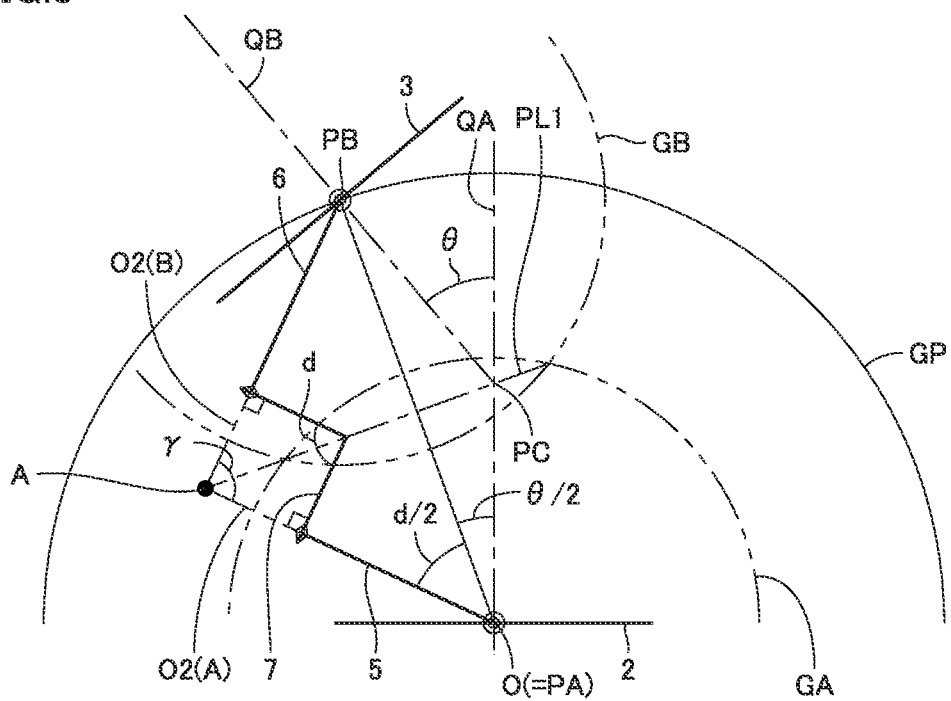
FIG. 8 is a schematic diagram of the link actuation apparatus while link hub central axis QB on the tip end side forms a certain angle with respect to link hub central axis QA on the base end side.

FIG. 7 is a perspective view of the link actuation apparatus while link hub central axis QB on the tip end side forms a certain angle with respect to link hub central axis QA on the base end side. FIG. 8 is a schematic diagram of the link actuation apparatus while link hub central axis QB on the tip end side forms a certain angle with respect to link hub central axis QA on the base end side.

FIG. 7 shows a perspective view of the link actuation apparatus in an arbitrary attitude (angle of bending θ and angle of revolution ϕ) and FIG. 8 shows a model diagram of FIG. 7. Point A is always located on bisecting plane PL1, and this point A can be regarded as one two-degree-of-freedom joint. When angle of bending θ is set, an angle formed between the straight line that connects spherical link center PA on the base end side and spherical link center PB on the tip end side to each other and central axis QA of link hub 2 on the base end side is θ/2. An angle formed between the straight line that connects spherical link center PA on the base end side and spherical link center PB on the tip end side to each other and the straight line that passes through spherical link center PA on the base end side and point A is d/2. Parallel link mechanism 1 is a mechanism that makes a motion while it maintains such relation.

Since parallel link mechanism 1 is of the two degree-of-freedom mechanism, the position of link hub 3 on the tip end side can be derived when two arm rotation angles β are determined. Center PB of link hub 3 on the tip end side of parallel link mechanism 1 makes a motion on a spherical surface GP with center PA of link hub 2 on the base end side being defined as a center O in FIG. 8.

Figure 9:
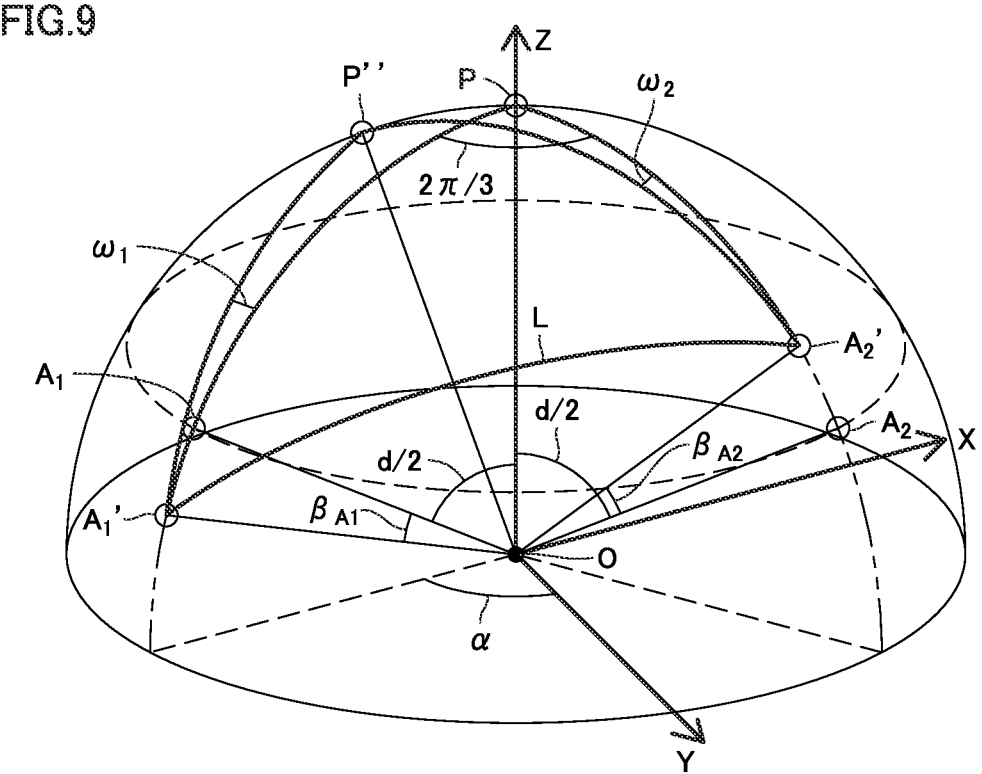
FIG. 9 is a diagram showing a model for calculating ω.
Figure 10:
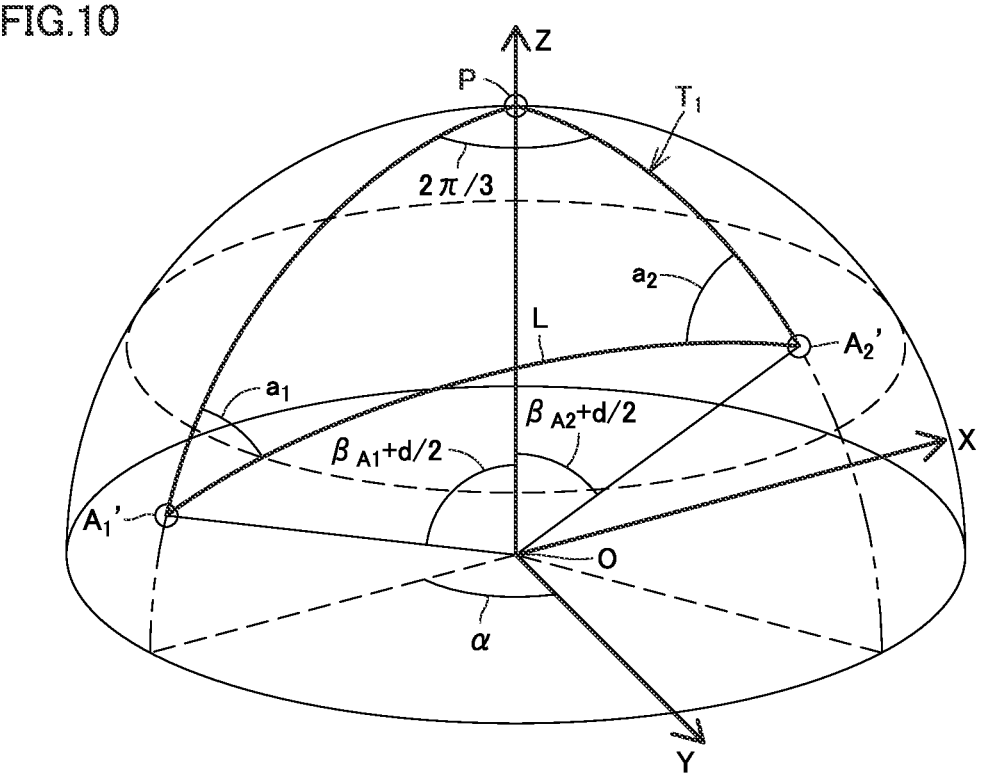
FIG. 10 is a diagram showing a model of a triangle on a unit spherical surface with a radius at a point A being defined as 1.
Figure 11:
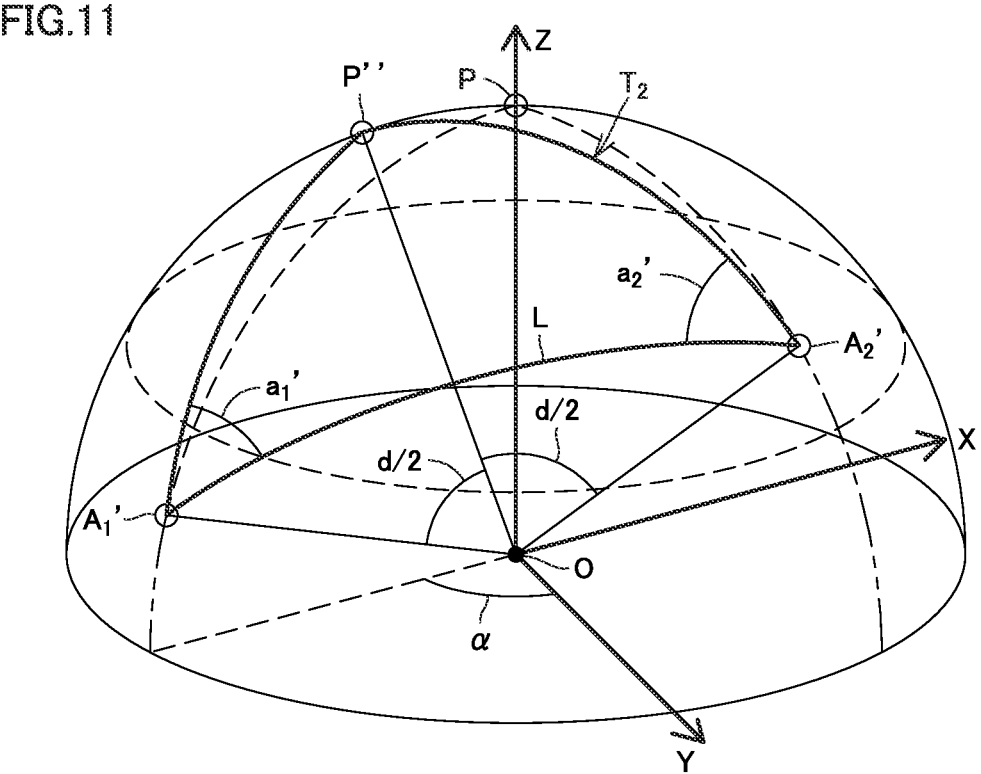
FIG. 11 is a diagram showing another model of a triangle on the unit spherical surface.
Figure 12:
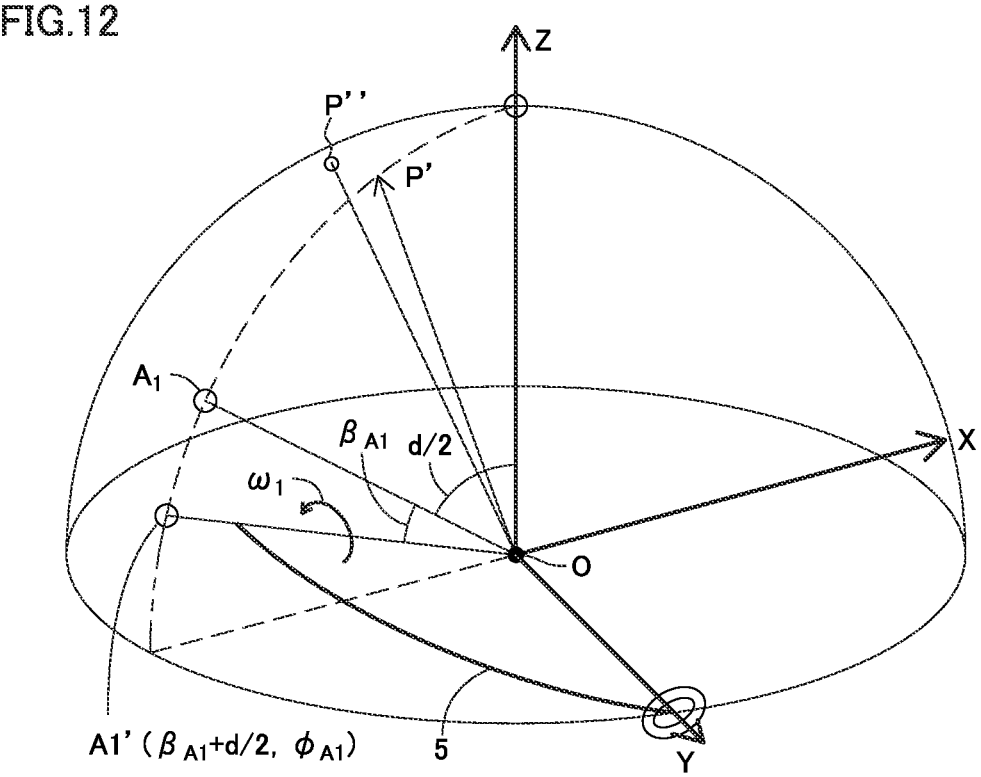
FIG. 12 is a diagram showing a model of forward kinematics.

FIG. 9 is a diagram showing a model for calculating ω. FIG. 10 is a diagram showing a model of a triangle on a unit spherical surface with a radius at point A being defined as 1. FIG. 11 is a diagram showing another model of a triangle on the unit spherical surface. FIG. 12 is a diagram showing a model of forward kinematics. The spherical surface in FIG. 9 or following figures represents the unit sphere with a distance from center O to point A being defined as 1. Since an arc of a great circle on the spherical surface thus has a length equal to a central angle of the arc, the law of sines and cosines of spherical trigonometry which will be described later can easily be applied.

Points A of a first link mechanism and a second link mechanism of three link mechanisms 4 at the zero position are denoted as points $A_1$ and $A_2$, respectively. Points A of the first link mechanism and the second link mechanism in a certain attitude are denoted as points $A_1'$ and $A_2'$, respectively.

In parallel link mechanism 1, three link mechanisms 4 are arranged at regular intervals. Therefore, an angle formed between the central axis of the revolute pair portion of link hub 2 on the base end side and end link member 5 on the base end side in each of three link mechanisms 4 is 2π/3.

When end link member 5 on the base end side rotates in the first link mechanism around a Y axis, point $A_1'$ moves on an arc $PA_1$ and an extension thereof. When end link member 5 on the base end side rotates in the second link mechanism around an axis resulting from rotation by 2π/3 from the Y axis, point $A_2'$ moves on an arc $PA_2$ and an extension thereof.

Since forward kinematics serves to derive the attitude of link hub 3 on the tip end side based on an angle β of end link member 5 on the base end side, a difference between the angle of end link member 5 on the base end side in a certain attitude and the angle of end link member 5 at the zero position is assumed to have already been known. Differences in the first link mechanism and the second link mechanism are denoted as angles $\beta_{A1}$ and $\beta_{A2}$, respectively.

FIG. 10 shows a model of a unit sphere and a spherical triangle. FIG. 10 shows a point of intersection of the central axis of link hub 2 on the base end side with the unit sphere as point P and shows with a bold line, a spherical triangle $T_1$ on the surface of the unit sphere defined by connecting point P to points $A_1'$ and $A_2'$. In general, for a spherical triangle ABC defined by three points A, B, and C on the spherical surface, with sides BC, CA, and AB being denoted as a, b, and c, respectively and with an angle formed between an arc AB and an arc AC, an angle formed between arc AB and an arc BC, and an angle formed between an arc CB and arc AC being denoted as A, B, and C, respectively, the law of cosines is expressed in an expression (1) below and the law of sines is expressed in an expression (2), based on spherical trigonometry.

[Expression 1]

$$\cos a = \cos b \cos c + \sin b \sin c \cos A \quad (1)$$

[Expression 2]

$$\frac{\sin a}{\sin A} = \frac{\sin b}{\sin B} = \frac{\sin c}{\sin C} \quad (2)$$

In triangle $T_1$ in FIG. 10, with a counterclockwise direction being defined as a positive direction, magnitude of sides is shown in expressions (3) and (4) below. With a length of an arc $A_1'A_2'$ being denoted as L, the expression (1) can be transformed as in an expression (5).

[Expression 3]

$$PA_1' = \frac{d}{2} + \beta_{A1} \quad (3)$$

[Expression 4]

$$PA_2' = \frac{d}{2} + \beta_{A2} \quad (4)$$

[Expression 5]

$$\cos L = \cos PA_1' \cos PA_2' + \sin PA_1' \sin PA_2' \cos \frac{2}{3}\pi \quad (5)$$

Angles $a_1$ and $a_2$ can be expressed as in expressions (7) and (8), respectively, based on the expression (1) and an expression (6) below.

[Expression 6]

$$\cos PA_1' = \cos L \cos PA_2' + \sin L \sin PA_2' \cos a_2 \quad (6)$$

[Expression 7]

$$a_1 = \cos^{-1}\left(\frac{\cos PA_2' - \cos L \cos PA_1'}{\sin PA_1' \sqrt{1 - \cos^2 L}}\right) \quad (7)$$

[Expression 8]

$$a_2 = \cos^{-1}\left(\frac{\cos PA_2' - \cos L \cos PA_2'}{\sin PA_2' \sqrt{1 - \cos^2 L}}\right) \quad (8)$$

FIG. 11 shows with a bold line, a spherical triangle $T_2$ defined by connecting a center P''' of the link hub on the tip end side to $A_1'$ and $A_2'$. An angle $a_1'$ is expressed in an expression (9) below, based on the expression (1).

[Expression 9]

$$a_1' = \cos^{-1}\left(\frac{\cos\frac{d}{2} - \cos L \cos\frac{d}{2}}{\sin\frac{d}{2}\sqrt{1 - \cos^2 L}}\right) \quad (9)$$

When an intersection between an extension of OA and sphere GP is denoted as A' in FIG. 8, an interior angle of an arc A'PB is d/2 and it remains unchanged. This relation is kept in connection with any angle of bending and angle of revolution, and the arc is on the unit sphere. Therefore, a side P''$A_2'$ of spherical triangle $T_2$ has a length d/2, and P''$A_1'$ also similarly has a length d/2. Therefore, triangle $T_2$ is a spherical isosceles triangle. Therefore, when ∠P''$A_1'A_2'$ and ∠P''$A_2'A_1'$ are set to $a_1'$ and $a_2'$, respectively, relation of $a_1'=a_2'$ is satisfied.

When $OA_1'$ and $OA_2'$ are set as rotation axes, slant angles $\omega_1$ and $\omega_2$ (FIG. 9) at the time of rotation of arms on the base end side are expressed in expressions (10) and (11) below, respectively. ω represents a slant angle with respect to each central link in an initial attitude when the arm on the base end side rotates. It is end link member 5 which is the arm on the base end side that rotates. Therefore, rotation axes of the central links are $OA_1'$ and $OA_2'$ and the central link rotates at slant angle ω.

[Expression 10]

$$\omega_1 = a_1' - a_1 \quad (10)$$

[Expression 11]

$$\omega_2 = a_2' - a_2 \quad (11)$$

Derivation of the expression in forward kinematics will be described by using the model in FIG. 12. What is to be shown in FIG. 12 is that calculation in forward kinematics can be realized by two-step rotation shown in (1) and (2) below.

(1) The link on the base end side rotates by $\beta_{A1}$ and that rotation brings about movement of point P to a point P'.

(2) A kinematic pair portion $A_1'$ of the link on the base end side and the central link after the rotation rotates by $\omega_1$, which brings about movement of point P' to a point P".

Since the link on the base end side rotates around a rotation axis Y in (1), rotation can be expressed also as rotation around the Y axis. The Rodrigues' formula with the rotation axis being defined as (0, 1, 0) is the same as an expression of rotation around the Y axis.

At a coordinate $(\beta_{A1}+d/2, \phi_{A1})$ of $A_1'$ in FIG. 12, $\phi_{A1}$ represents the angle of revolution corresponding to point A, and represents an angle from the X coordinate axis of a circle at a bottom surface to a straight line shown with a dashed line as defined in FIG. 12 (a position at 180° in FIG. 12).

The expression in forward kinematics is derived by rotating center point P of the link hub on the tip end side, with attention being paid to the first link mechanism. In FIG. 12, end link member 5 on the base end side rotates around the Y axis. Therefore, center point P is initially rotated by $\beta_{A1}$ around the Y axis and further rotated by $\omega_1$ around $OA_1'$. Then, a vector from center O of the link hub on the base end side to center P" of the link hub on the tip end side coincides with a position of a coordinate of the tip end after such an operation. Rotation around any axis can be expressed by the Rodrigues' rotation formula. r' is expressed in an expression (12) below, where n represents a unit vector of the rotation axis, r represents a vector before rotation, r' represents the vector after rotation, and an angle θ represents an amount of rotation. Alternatively, an expression (13) obtained by substituting the expression (12) with a transformation formula using a 3×3 matrix is held.

[Expression 12]

$$r' = r\cos\theta + (1-\cos\theta)(r \cdot n)n + (n \times r)\sin\theta \quad (12)$$

[Expression 13]

$$r' = R_n(\theta)r \quad (13)$$

$R_n(\theta)$ represents an expression obtained by expressing with a 3×3 rotation matrix, the expression (12) based on the Rodrigues' rotation formula in rotating the coordinate of r by angle θ around an n axis. Though the expression (12) and the expression (13) are considerably different from each other in specific representation, the expression (12) is written in a format of a vector equation, whereas the expression (13) is an equivalent expression which is linear transformation of r and from which the same result is derived.

When an initial position P of a position vector of a center point of the link hub on the tip end side is expressed as P=(0, 0, 1), a position vector P' after rotation of initial position P by angle $\beta_{A1}$ around the Y axis is expressed in an expression (14) below.

[Expression 14]

$$P' = R_y(\beta_{A1})P \quad (14)$$

Then, a position vector P" after rotation of position vector P' by an angle $\omega_1$ with $OA_1$ being defined as a rotation axis n1 is expressed in an expression (15) below.

[Expression 15]

$$P'' = R_{n1}(\omega_1)P' \quad (15)$$

Since P' represents a function of $\beta_{A1}$ and P" represents a function of $\omega_1$ (=a function of $\beta_{A1}$ and $\beta_{A2}$), the position and the attitude of center point P" of the link hub on the tip end side can be calculated from two of angles β of three end link members 5 on the base end side.

<Inverse Kinematics>

Figure 13:
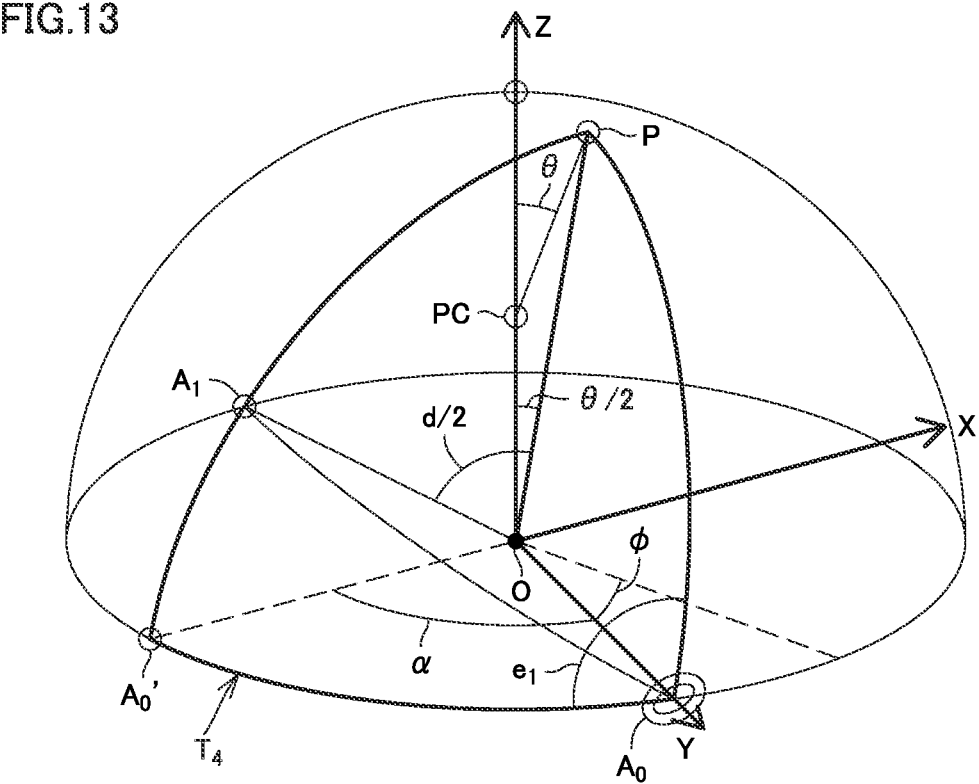
FIG. 13 is a first diagram for illustrating derivation of an expression in inverse kinematics.
Figure 14:
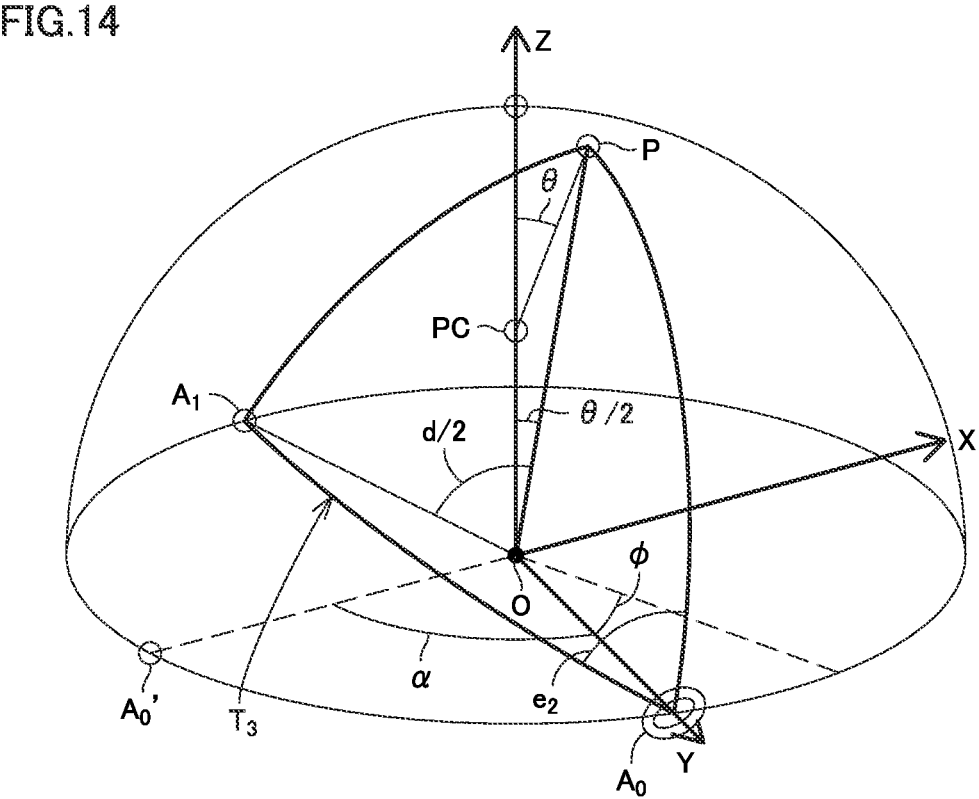
FIG. 14 is a second diagram for illustrating derivation of an expression in inverse kinematics.

FIG. 13 is a first diagram for illustrating derivation of an expression in inverse kinematics. FIG. 14 is a second diagram for illustrating derivation of an expression in inverse kinematics. Derivation of the expression in inverse kinematics will be described with reference to FIGS. 13 and 14. In calculation in inverse kinematics, a spherical triangle $T_3$ defined by points P, $A_0$, and $A_1$ and a spherical triangle $T_4$ defined by points P, $A_0$, $A_0'$ are discussed. $A_0$ represents a point where the central axis of the revolute pair portion of link hub 3 on the base end side and end link member 6 on the base end side intersects with the unit spherical surface, with O representing the origin and P representing a vertex at the zero position. $A_0'$ represents a point located at a position resulting from rotation by $-\alpha$ around a Z axis from point $A_0$.

Point $A_1$ is not necessarily a point on the bisecting plane, and it is a position of the kinematics pair portion of the link on the base end side and the central link when the center on the tip end side is located at P. When the center on the tip end side is in the initial state, that is, located on the Z axis, point $A_1$ is located on the bisecting plane.

An expression in inverse kinematics can be derived by calculating an angle $e_1$ shown in FIG. 13 and $e_2$ shown in FIG. 14. Initially by using the spherical law of cosines for $T_4$, an expression (17) is obtained from an expression (16) below.

[Expression 16]

$$\cos\angle A_0'OP = \cos\angle A_0OA_0'\cos\angle A_0OP + \sin\angle A_0OA_0'\sin\angle A_0OP\cos e_1 \quad (16)$$

[Expression 17]

$$\cos e_1 = \frac{\cos\angle A_0'OP - \cos\angle A_0OA_0'\cos\angle A_0OP}{\sin\angle A_0OA_0'\sin\angle A_0OP} \quad (17)$$

An expression (19) is obtained from an expression (18) below, by similarly using the spherical law of cosines for $T_3$.

[Expression 18]

$$\cos\angle A_1OP = \cos\angle A_0OA_1\cos\angle A_0OP + \sin\angle A_0OA_1\sin\angle A_0OP\cos e_2 \quad (18)$$

[Expression 19]

$$\cos e_2 = \frac{\cos\angle A_1OP - \cos\angle A_0OA_1\cos\angle A_0OP}{\sin\angle A_0OA_1\sin\angle A_0OP} \quad (19)$$

Since $\angle A_0OA_1$ and $\angle A_0OA_0'$ each represent an arm angle $\alpha$ and $\angle A_1OP$ is $d/2$, angle $e_1$ and angle $e_2$ are expressed in expressions (20) and (21) below.

[Expression 20]

$$e_1 = \cos^{-1}\left(\frac{\cos\angle A_0'OP - \cos\alpha\cos\angle A_0OP}{\sin\alpha\sin\angle A_0OP}\right) \quad (20)$$

[Expression 21]

$$e_2 = \cos^{-1}\left(\frac{\cos\frac{d}{2} - \cos\alpha\cos\angle A_0OP}{\sin\alpha\sin\angle A_0OP}\right) \quad (21)$$

$\alpha$ represents an angle formed by the end link member on the base end side and determined by a structure of a member. Therefore, $e_1$ and $e_2$ are functions of link hub center point P ($\theta$, $\phi$) on the tip end side. Therefore, when $\beta_{A1}$ at the zero position is set to 0, $\beta_{A1}$ can be expressed in an expression (22) below.

[Expression 22]

$$\beta_{A1} = e_1 - e_2 \quad (22)$$

The expression (22) is an expression in inverse kinematics of parallel link mechanism 1 in the present embodiment.

According to the link actuation apparatus in the present embodiment, expressions in forward transformation and inverse transformation of the link actuation apparatus are derived by using general spherical trigonometry. Therefore, repetitive operations are not required and the current position of the tip end can quickly be known or arm rotation angle β can quickly be calculated. Since arm rotation angle β not including an approximation error is calculated, by rotating all drive sources for attitude control in the same direction to apply constant torque, accuracy in constant torque load control for suppressing wobble due to mechanical play is enhanced and accuracy in positioning can be improved.

The calculation method shown in the present embodiment can be applied as calculation of any arm angle α in forward kinematics and inverse kinematics, and can adapt to various design specifications of the link actuation apparatus. Though an angle is used in these expressions, an expression using an arc length instead of the angle may be used because an arc length of a unit sphere is equal to a central angle formed by two certain straight lines in the unit sphere. Since a term in a sine or cosine function is considered at the unit spherical surface, load imposed by calculation processing can also be lessened by using, for example, a norm of an inner or outer product of vector P or $A_0$.

<Control Using Forward Kinematics and Inverse Kinematics>

Controller 100 carries out control shown below by using a mathematical expression in forward kinematics or inverse kinematics derived as above.

Figure 15:
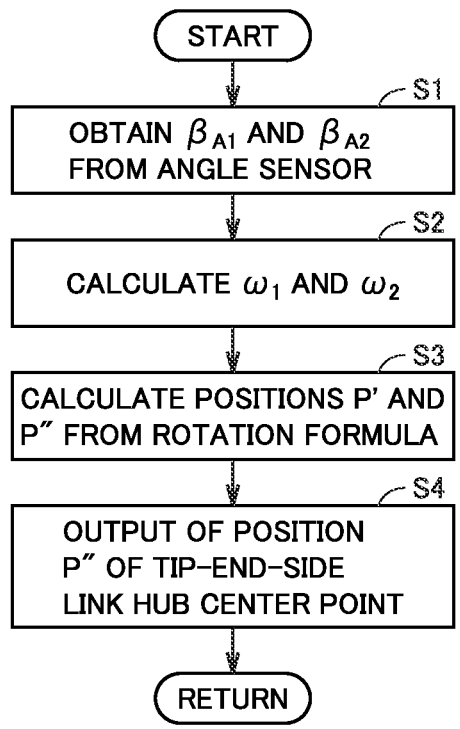
FIG. 15 is a flowchart for illustrating processing for obtaining a position of a center point of the link hub on the tip end side from an angle of an end link member on the base end side by forward kinematics.

FIG. 15 is a flowchart for illustrating processing for obtaining a position of a center point of the link hub on the tip end side from an angle of the end link member on the base end side by forward kinematics Processing in this flowchart is performed by controller 100, for example, in carrying out direct teaching or at the time of start from a state that the current position is unknown, such as after recovery from abnormality.

In step S1, controller 100 obtains angles $\beta_{A1}$ and $\beta_{A2}$ from a not-shown angle sensor. Then, in step S2, controller 100 calculates angles $\omega_1$ and $\omega_2$ based on the expressions (3) to (11) that explain forward kinematics. Furthermore, in step S3, controller 100 calculates positions P' and P'' of the center point of the link hub on the tip end side by using the expression (12) or (13) based on the Rodrigues' rotation formula. Then, in step S4, controller 100 provides position P'' of the tip-end-side link hub to a higher-order controller or a display.

Figure 16:
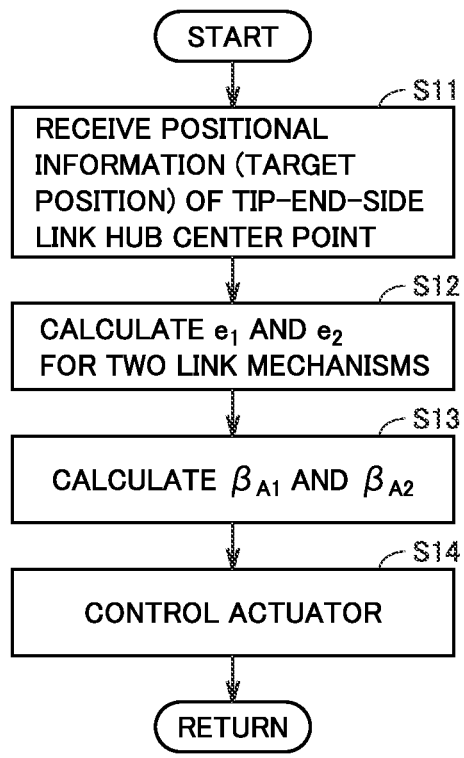
FIG. 16 is a flowchart for illustrating processing for obtaining an angle of the end link member on the base end side from a position of a center point of the link hub on the tip end side by inverse kinematics.

FIG. 16 is a flowchart for illustrating processing for obtaining an angle of the end link member on the base end side from the position of the center point of the link hub on the tip end side by inverse kinematics. Processing in this flowchart is performed by controller 100, for example, when works are done with an attitude of end effector 61 being varied by parallel link mechanism 1.

In step S11, controller 100 receives positional information (a target position) of the link hub on the tip end side from an input apparatus or a not-shown higher-order controller. Then, in step S12, controller 100 calculates angle $\beta_{A1}$ based on the expressions (16) to (22) that explain inverse kinematics and calculates also angle $\beta_{A2}$ in a similar procedure. Furthermore, in step S3, controller 100 controls corresponding actuator 51 such that an angle of rotation of end link member 5 attains to angle $\beta_{A1}$ and angle $\beta_{A2}$. By repeating such processing, the position and the attitude of the tip-end-side link hub are controlled to a desired state.

The present embodiment will finally be summarized with reference again to the drawings.

Link actuation apparatus 50 in the present embodiment includes first link hub 2 on the base end side, second link hub 3 on the tip end side, and at least three link mechanisms 4 that couple first link hub 2 and second link hub 3 to each other. Each of at least three link mechanisms 4 includes first end link member 5 rotatably coupled to first link hub 2, second end link member 6 rotatably coupled to second link hub 3, and central link member 7 rotatably coupled to each of first end link member 5 and second end link member 6. In at least three link mechanisms 4, at least three central axes O1 of the revolute pair portions of first link hub 2 and first end link members 5 and central axis O2 of the revolute pair portion of one end of central link member 7 intersect at first link hub center point PA, and at least three central axes of the revolute pair portions of second link hub 3 and second end link members 6 and the central axis of the revolute pair portion of the other end of central link member 7 intersect at second link hub center point PB. Link actuation apparatus 50 further includes controller 100 configured to calculate based on spherical trigonometry, a position and an attitude of second link hub 3 from angles $\beta_{A1}$ and $\beta_{A2}$ of first end link members 5 with respect to first link hub 2 in two of at least three link mechanisms 4.

According to such a construction, the spherical drive mechanism in which link hub 3 on the tip end side operates as being in symmetry with respect to bisecting plane PL1 where spheres GA and GB having link hub center points PA and PB on the base end side and the tip end side as the center points intersect with each other is constructed. According to such a construction, expressions in forward transformation and inverse transformation based on the spherical trigonometry can be derived, and hence general-purpose forward kinematics and inverse kinematics can be expressed as a function in the link actuation apparatus with various design specifications.

Link actuation apparatus 50 desirably includes controller 100 with a function for calculation based on the spherical trigonometry in order to find a position of link hub center point PB on the tip end side from angles $\beta_{A1}$ and $\beta_{A2}$ of end link member 5 on each base end side. According to this construction, a function to perform direct teaching or an operation to move over a long distance in real time from a state that the current position is unknown, such as after recovery from abnormality, can be performed.

Preferably, controller 100 is configured to calculate based on a relational expression below, the attitude of second link hub 3 from angles $\beta_{A1}$ and $\beta_{A2}$ that represent the attitude of first end link member 5 with respect to first link hub 2:

$$P' = R_y(\beta_{A1})P$$
$$P'' = R_{n1}(\omega_1)P'$$

where P represents a coordinate of the second link hub center point at a zero position, P'' represents a coordinate of the second link hub center point after movement from the zero position, $\beta_{A1}$ represents an angle of the first end link member with respect to the first link hub in a first link mechanism of the at least three link mechanisms, $\beta_{A2}$ represents an angle of the first end link member with respect to the first link hub in a second link mechanism of the at least three link mechanisms, $R_n(\theta)$ represents a 3×3 rotation matrix of the Rodrigues' rotation formula when the coordinate of P is rotated by an angle $\theta$ around an n axis, n1 represents straight line OA, with the first link hub center point being denoted as O and with an intersection between the central axis of the revolute pair portion of one end of the central link member and the central axis of the revolute pair portion of the other end of the central link member being denoted as A in the first link mechanism, and $\omega_1$ represents a slant angle of the central link member of the first link mechanism determined by $\beta_{A1}$ and $\beta_{A2}$.

Thus, controller 100 desirably performs the function for calculation based on the relational expression in forward kinematics to find the position of link hub center point PB on the tip end side from angles of rotation $\beta_{A1}$ and $\beta_{A2}$ of end link member 5 on each base end side. According to this construction, link actuation apparatus 50 can quickly be controlled by using forward transformation. Since an angle of rotation of the arm not including an approximation error is calculated at this time, accuracy in constant torque load control for suppressing wobble due to mechanical play is enhanced and accuracy in positioning can be improved.

Preferably, controller 100 is configured to calculate based on the spherical trigonometry, angles $\beta_{A1}$ and $\beta_{A2}$ of first end link member 5 from the position of center point PB of second link hub 3.

More preferably, controller 100 is configured to calculate based on a relational expression below, angles $\beta_{A1}$ and $\beta_{A2}$ representing the attitude of first end link member 5 from the position of center point PB of second link hub 3:

$$\beta_{A1} = e_1 - e_2$$

where $e_1$ and $e_2$ are shown in the already provided expressions (22) and (23).

Thus, link actuation apparatus 50 includes controller 100 that controls the attitude of link hub 3 on the tip end side with rotation of actuator 51 for attitude control. Controller 100 desirably performs the function for calculation based on the relational expression in inverse kinematics to find angles of rotation $\beta_{A1}$ and $\beta_{A2}$ of end link member 5 on each base end side from the position of link hub center point PB on the tip end side. According to this construction, angles of rotation $\beta_{A1}$ and $\beta_{A2}$ of end link member 5 on each base end side can be calculated when the attitude of the tip end is given.

It should be understood that the embodiment disclosed herein is illustrative and non-restrictive in every respect. The scope of the present invention is defined by the terms of the claims rather than the description of the embodiment above and is intended to include any modifications within the scope and meaning equivalent to the terms of the claims.

REFERENCE SIGNS LIST 1 parallel link mechanism; 2, 3 link hub; 4 link mechanism; 5, 6 end link member; 7 central link member; 10 base; 11, 21 rotation shaft coupling member; 12, 15, 22, 25 rotation shaft body; O1, n1 rotation axis; 12a large-diameter portion; 12b small-diameter portion; 20 tip end member; 30 curved member, 31, 31A rotation shaft support member, 50 link actuation apparatus; 51 actuator; 52 reducer mechanism; 52a output shaft body; 53 motor fixing member; 54 flange surface; 55 spacer; 56 bolt; 57 inner groove; 58 flange attachment surface; 61 end effector; 100 controller

The invention claimed is:
1. A link actuation apparatus comprising:
a first link hub on a base end side;
a second link hub on a tip end side;
at least three link mechanisms that couple the first link hub and the second link hub to each other,
each of the at least three link mechanisms including
a first end link member rotatably coupled to the first link hub,
a second end link member rotatably coupled to the second link hub, and
a central link member rotatably coupled to each of the first end link member and the second end link member,
in the at least three link mechanisms,
at least three central axes of revolute pair portions of the first link hub and the first end link members and a central axis of a revolute pair portion of one end of the central link member intersecting at a first link hub center point, and at least three central axes of revolute pair portions of the second link hub and the second end link members and a central axis of a revolute pair portion of the other end of the central link member intersecting at a second link hub center point; and a controller configured to calculate based on spherical trigonometry, a position and an attitude of the second link hub from angles of the first end link members with respect to the first link hub in two of the at least three link mechanisms.

2. The link actuation apparatus according to claim 1, wherein the controller is configured to calculate based on a relational expression below, the attitude of the second link hub from the angle of the first end link member with respect to the first link hub:

[Expression 1]
$$P' = R_y(\beta_{A1})P$$
$$P'' = R_{n1}(\omega_1)P'$$

where P represents a coordinate of the second link hub center point at a zero position, P'' represents a coordinate of the second link hub center point after movement from the zero position, $\beta_{A1}$ represents an angle of the first end link member with respect to the first link hub in a first link mechanism of the at least three link mechanisms, $\beta_{A2}$ represents an angle of the first end link member with respect to the first link hub in a second link mechanism of the at least three link mechanisms, $R_n(\theta)$ represents a 3×3 rotation matrix of Rodrigues' rotation formula when a coordinate of P is rotated by an angle $\theta$ around an n axis, n1 represents a straight line OA, with the first link hub center point being denoted as O and with an intersection between the central axis of the revolute pair portion of one end of the central link member and the central axis of the revolute pair portion of the other end of the central link member being denoted as A in the first link mechanism, and $\omega_1$ represents a slant angle of the central link member of the first link mechanism determined by $\beta_{A1}$ and $\beta_{A2}$.

3. The link actuation apparatus according to claim 1, wherein the controller is configured to calculate based on the spherical trigonometry, an angle representing the attitude of the first end link member from the position of the second link hub center point.

4. The link actuation apparatus according to claim 3, wherein the controller is configured to calculate based on a relational expression below, the angle representing the attitude of the first end link member from the position of the second link hub center point:

[Expression 2]
$$\beta_{A1} = e_1 - e_2$$
$$e_1 = \cos^{-1}\left(\frac{\cos\angle A'_O OP - \cos\alpha \cos\angle A_O OP}{\sin\alpha \sin\angle A_O OP}\right)$$
$$e_2 = \cos^{-1}\left(\frac{\cos\frac{d}{2} - \cos\alpha \cos\angle A_O OP}{\sin\alpha \sin\angle A_O OP}\right)$$

where $\beta_{A1}$ represents an angle of the first end link member with respect to the first link hub in a first link mechanism of the at least three link mechanisms, d represents a central angle of the central link member, $\alpha$ represents an arm angle, O represents the first link hub center point, $A_O$ represents an intersection between an axis of a rotation center of the first link hub and the first end link member and a unit spherical surface, $A_O'$ represents a point resulting from rotation by $-\pi/2$ of point $A_O$ around a z axis, and P represents the second link hub center point.

* * * * *